United States Patent [19]

Goettl

[11] 4,066,118

[45] Jan. 3, 1978

[54] AIR CONDITIONING SYSTEM

[76] Inventor: William H. Goettl, 2005 E. Indian School, Phoenix, Ariz. 85018

[21] Appl. No.: 677,730

[22] Filed: Apr. 16, 1976

[51] Int. Cl.² .................... F24D 11/00; F25B 27/00
[52] U.S. Cl. ............................... 165/18; 62/2; 62/160; 62/325; 126/270; 165/29; 237/2 B
[58] Field of Search .................. 165/29, 18; 62/324, 62/325, 160, 2; 126/270, 271; 237/2 B

[56] References Cited

U.S. PATENT DOCUMENTS

| 2,780,415 | 2/1957 | Gay | 165/29 |
|---|---|---|---|
| 3,366,166 | 1/1968 | Gerteis | 165/29 |
| 3,523,575 | 8/1970 | Olivieri | 165/29 |
| 3,548,923 | 12/1970 | Nakano | 165/29 |
| 3,563,304 | 2/1971 | McGrath | 165/29 |
| 3,608,625 | 9/1971 | Kendrick | 165/29 |
| 3,935,899 | 3/1976 | Jolly | 165/29 |
| 3,952,947 | 4/1976 | Saunders | 165/29 |

Primary Examiner—Charles J. Myhre
Assistant Examiner—Daniel J. O'Connor
Attorney, Agent, or Firm—Don J. Flickinger; William H. Dean

[57] ABSTRACT

The disclosure relates to an air conditioning system employing a heat pump in combination with facilities for thermal storage, evaporative cooling and solar heat collection, as well as solar heat radiation; the heat pump having an indoor heat exchanger and an outdoor heat exchanger and a third heat exchanger in series with the outdoor heat exchanger; the third heat exchanger being disposed to receive heat or cool air so as to augment operation of the heat pump during critical ambient conditions so as to improve the relative efficiency of the heat pump when operating under the aforementioned critical conditions.

11 Claims, 18 Drawing Figures

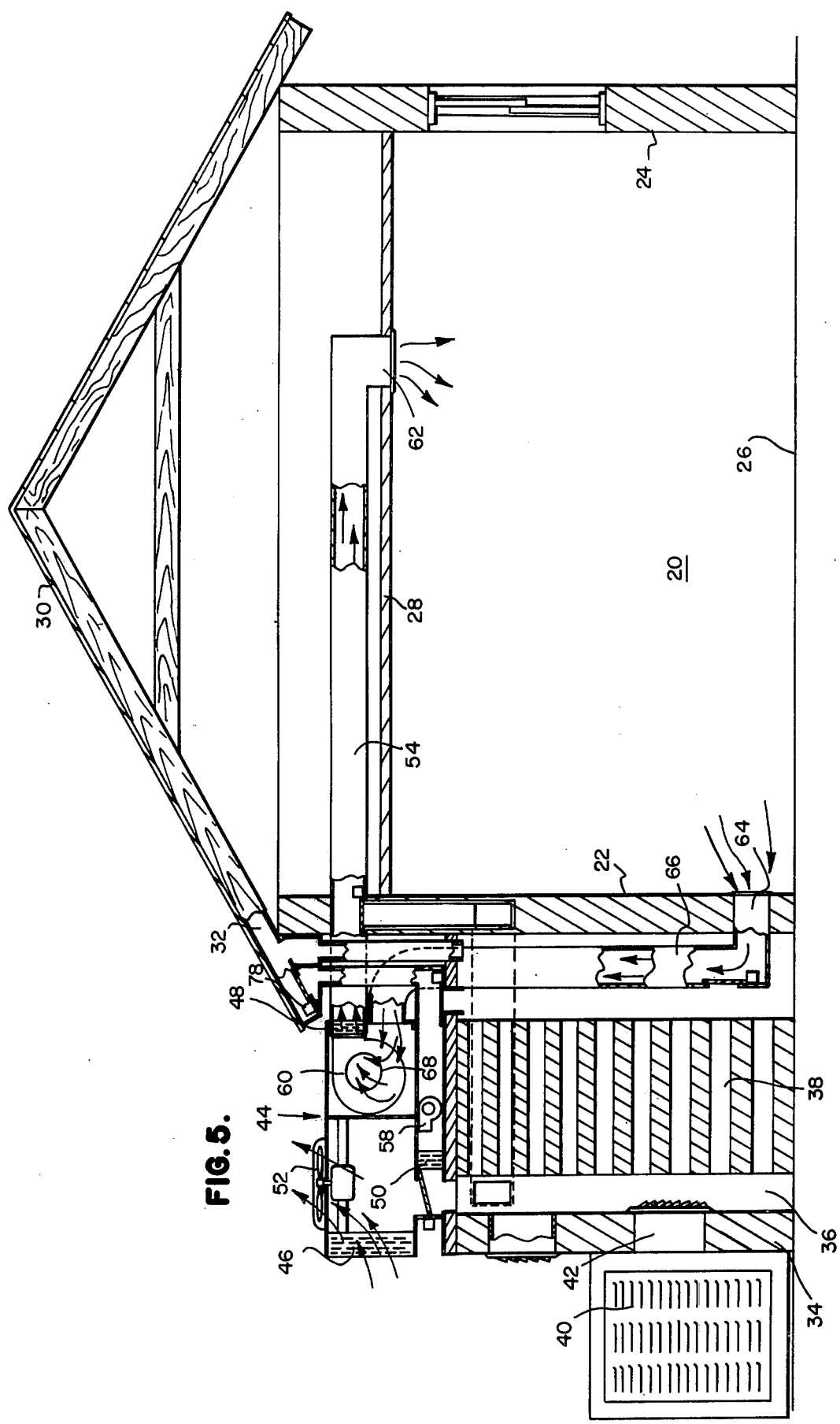

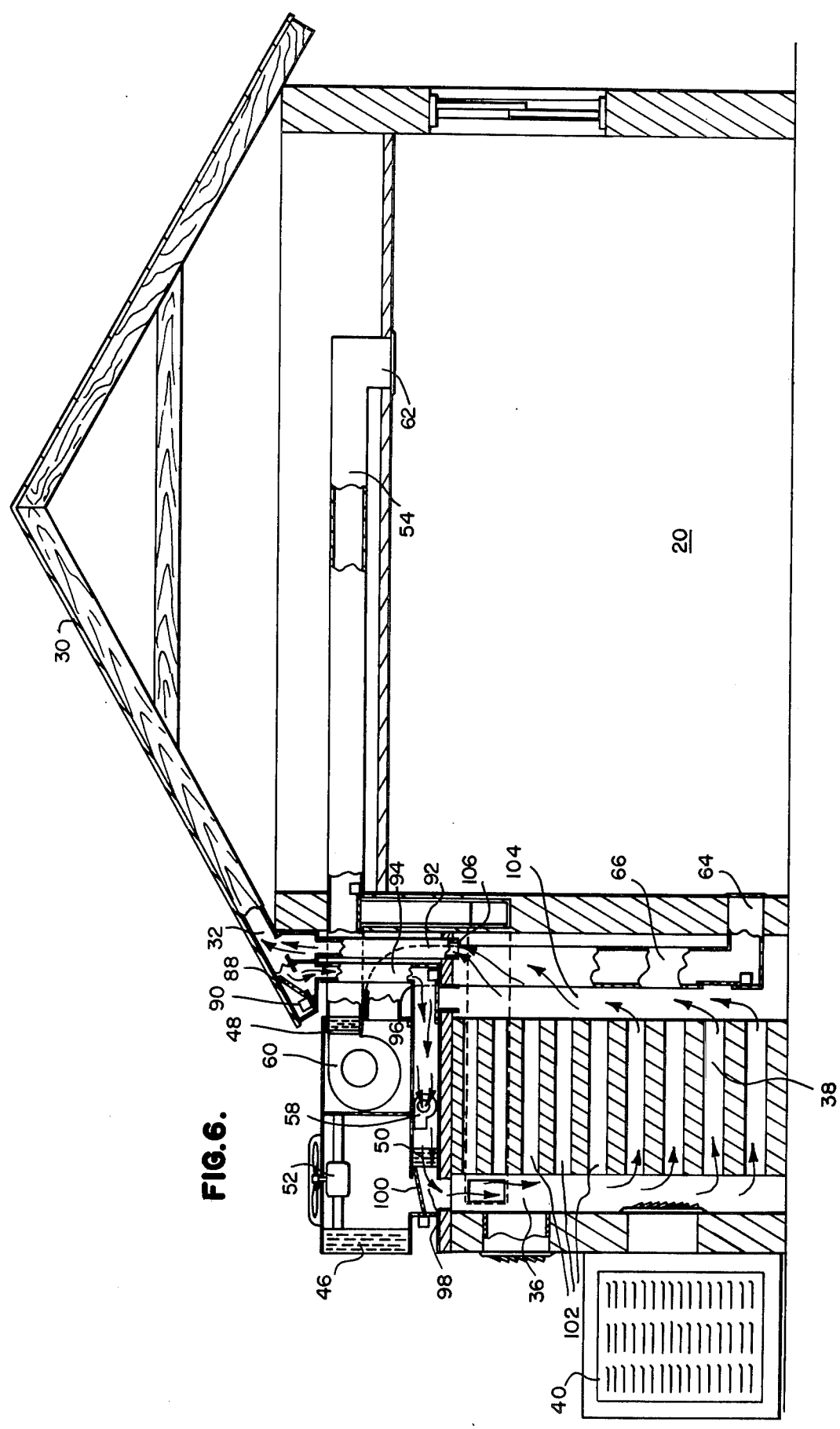

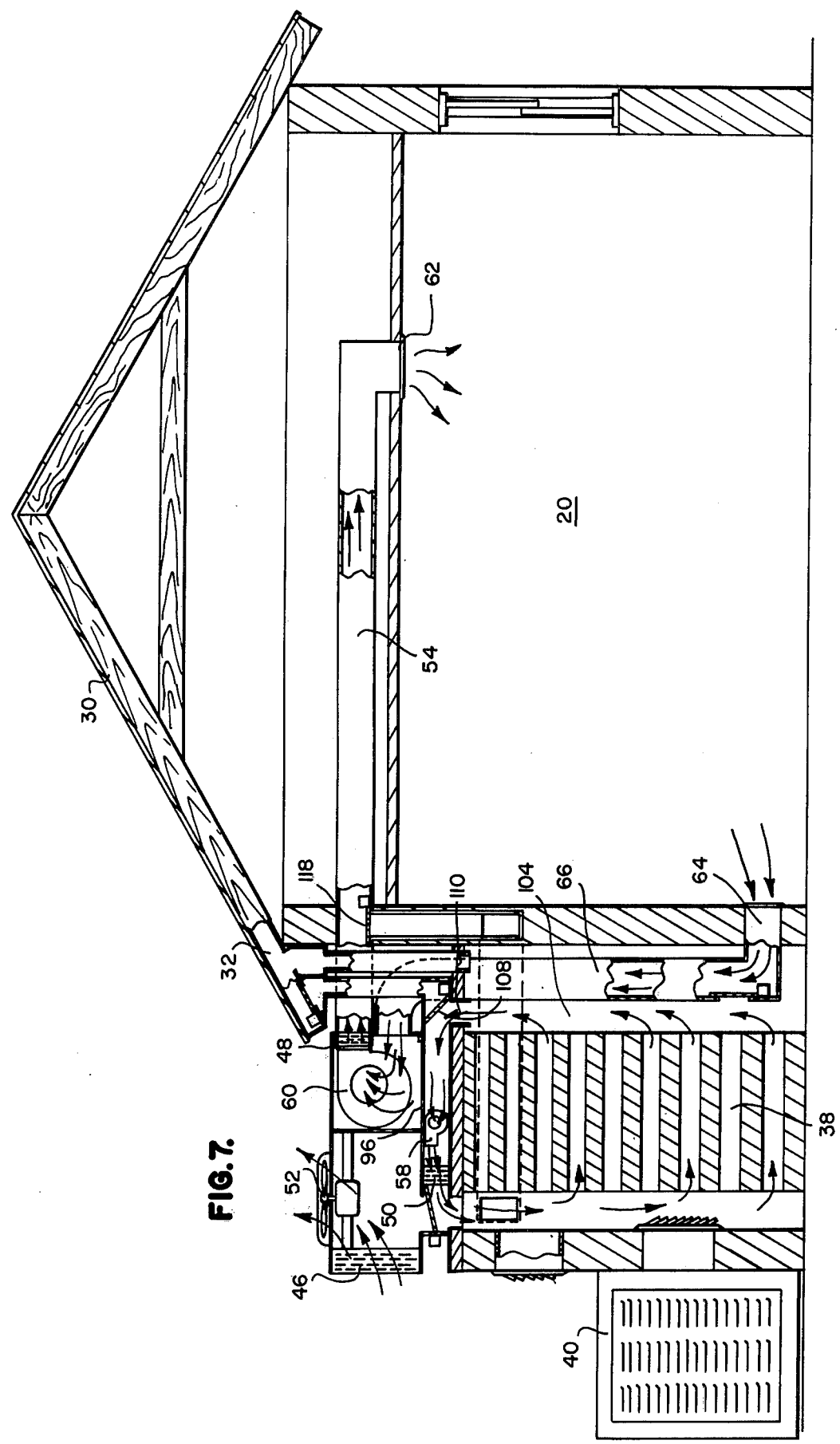

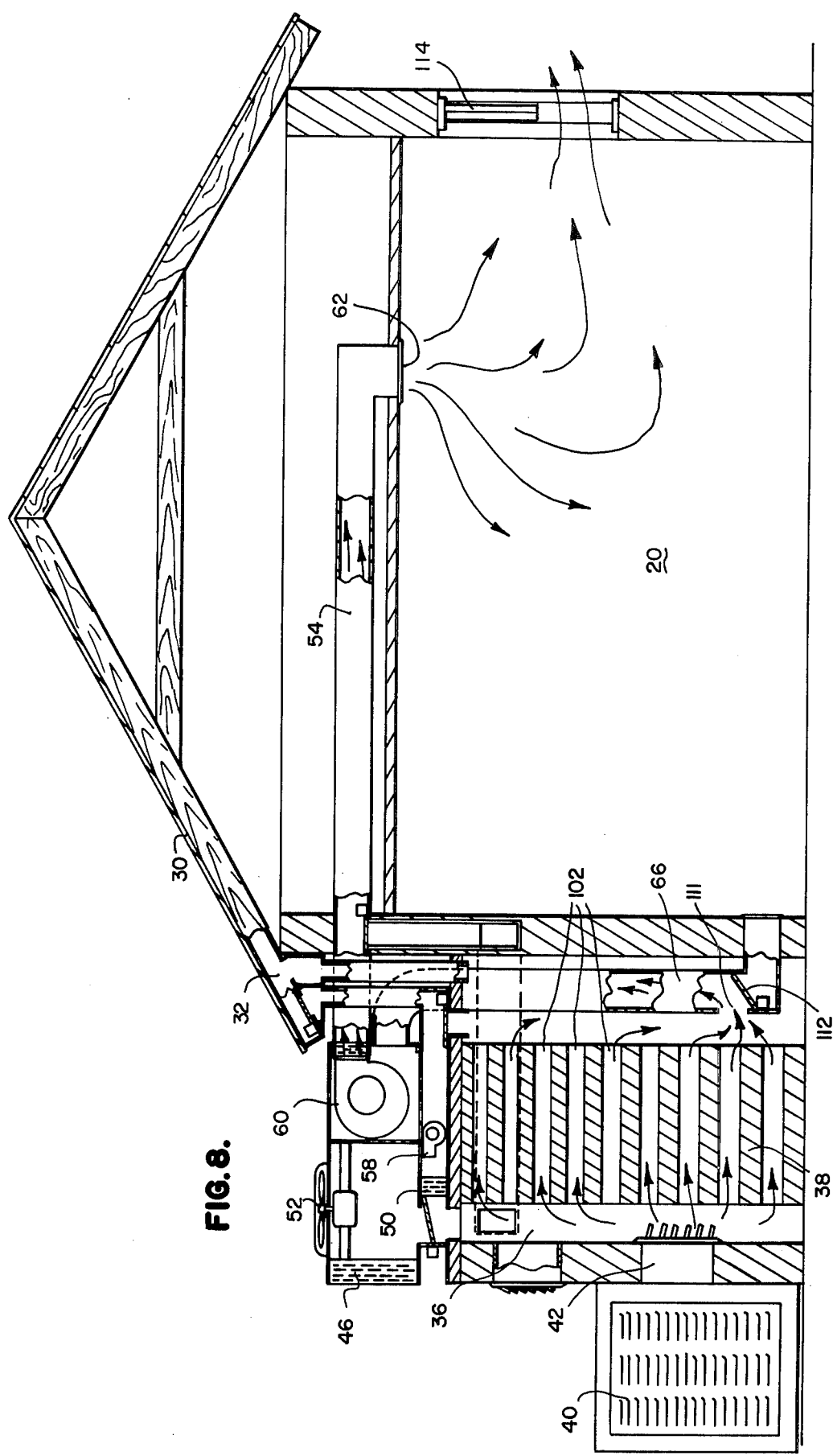

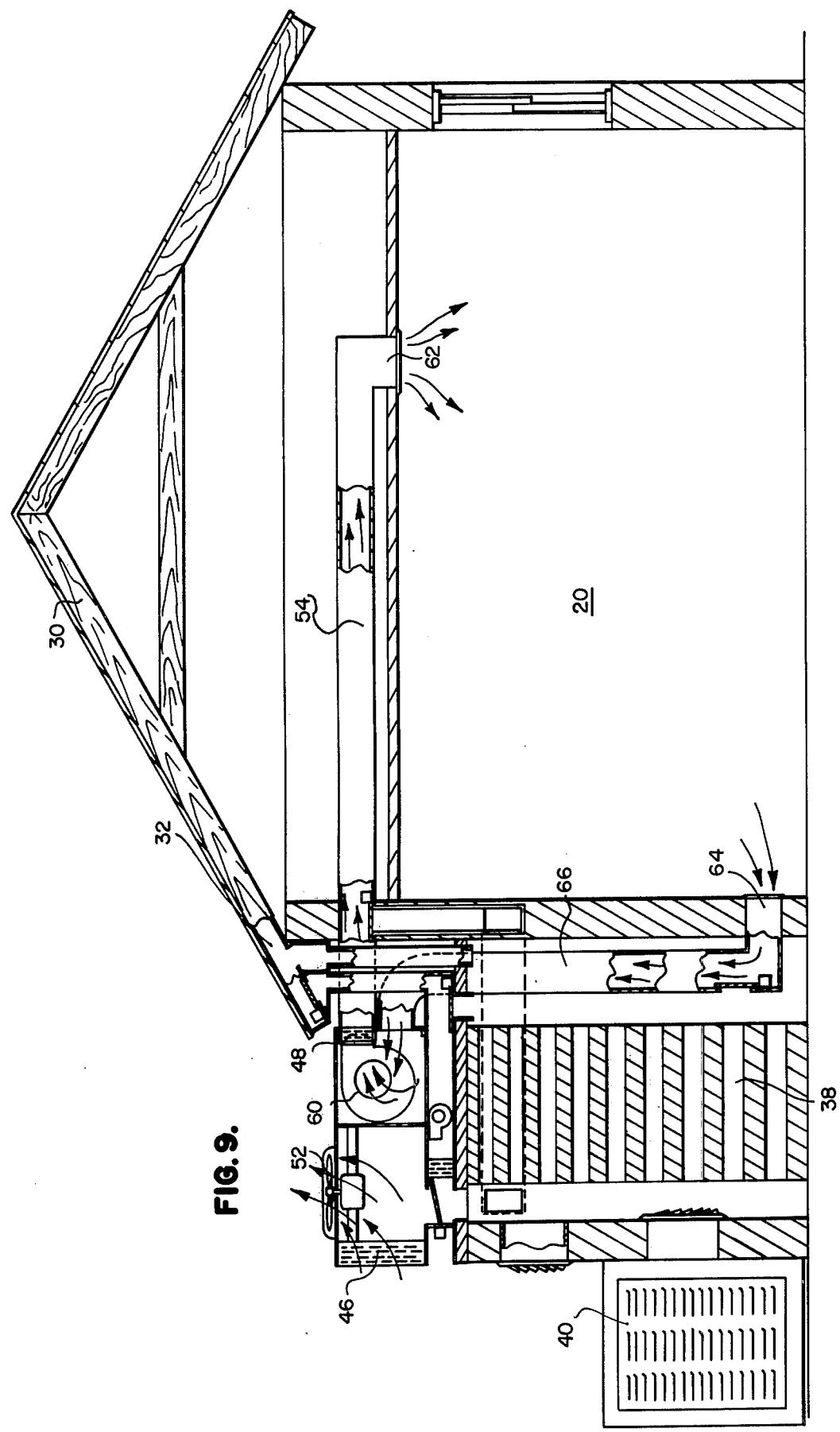

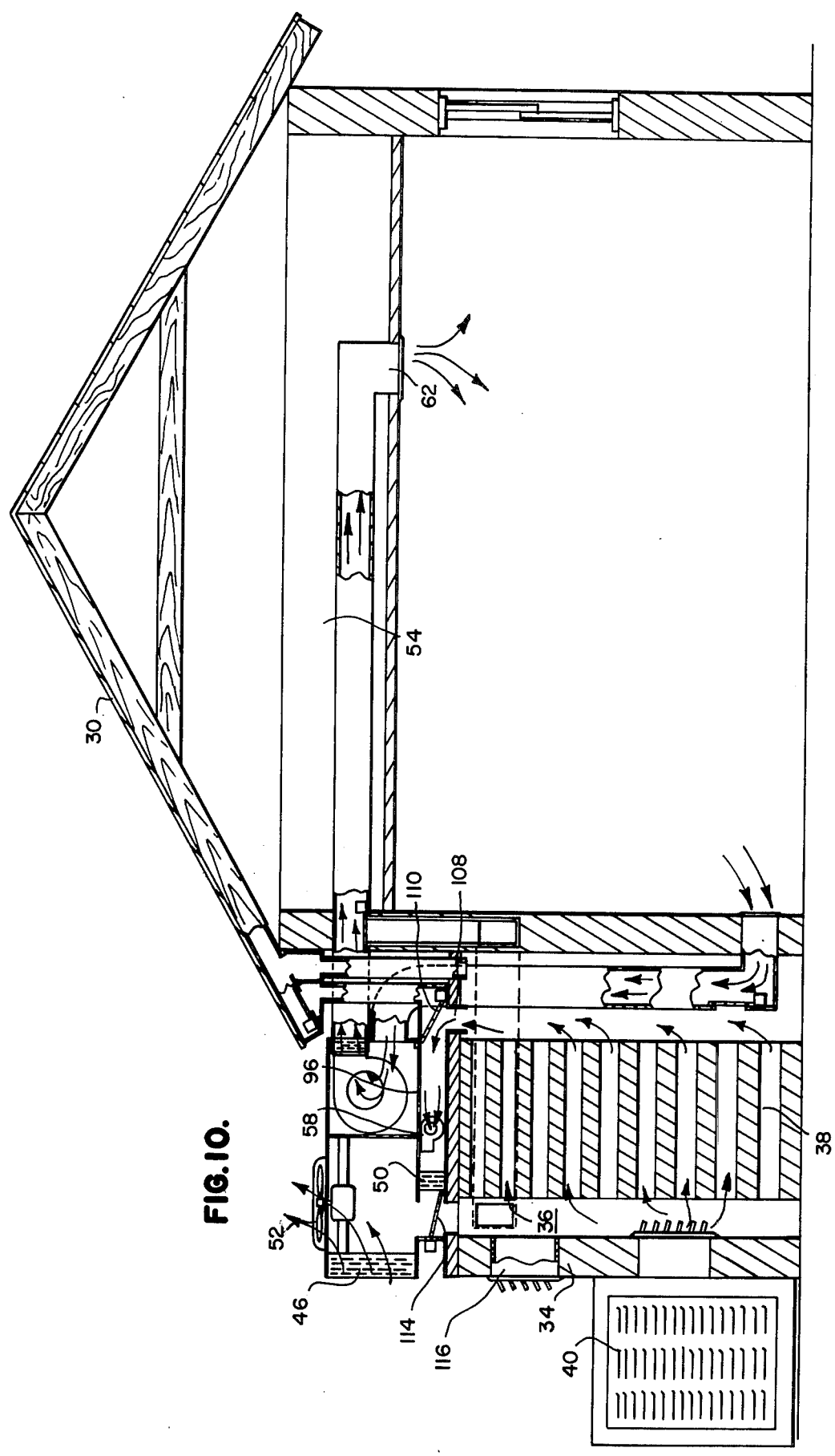

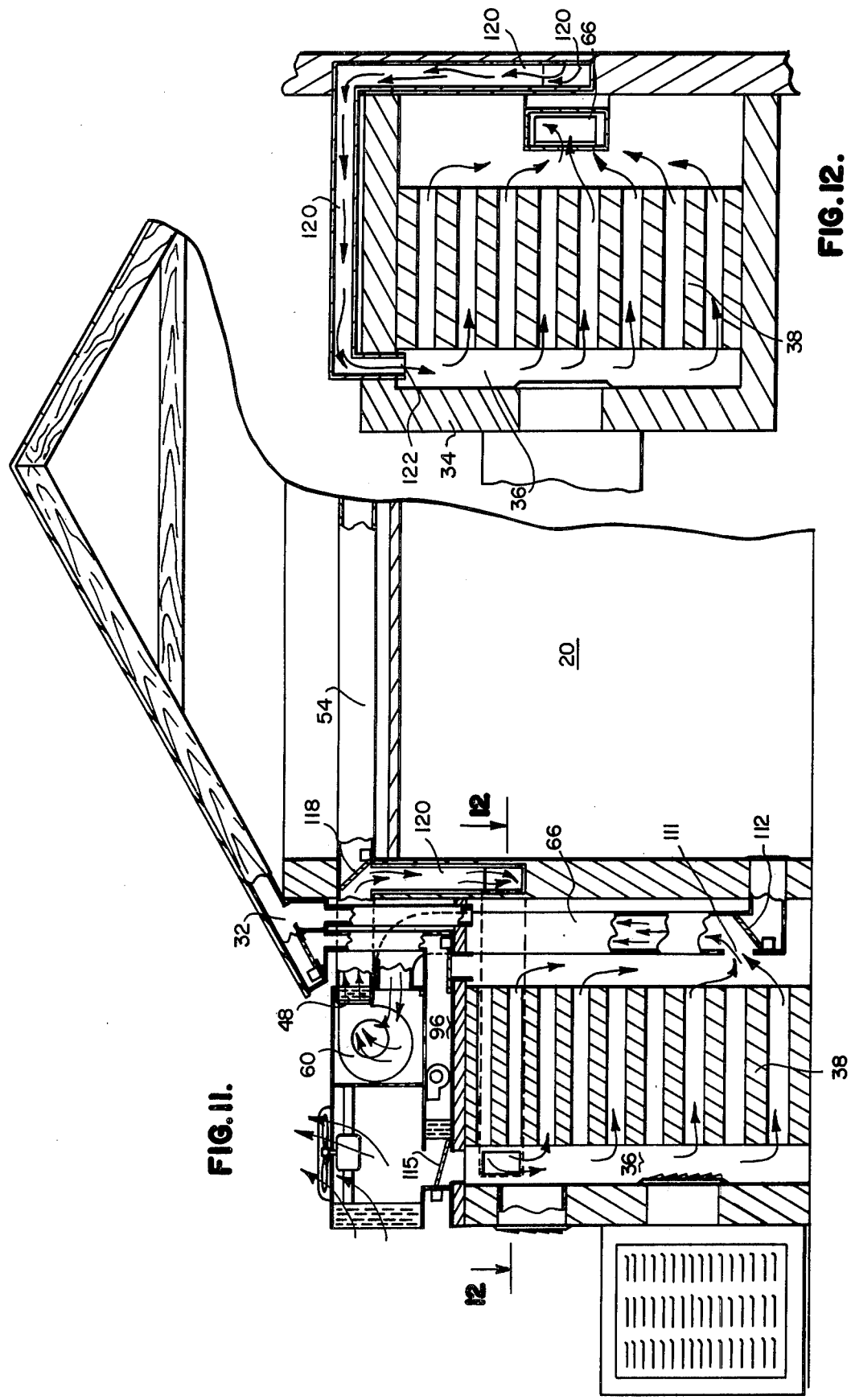

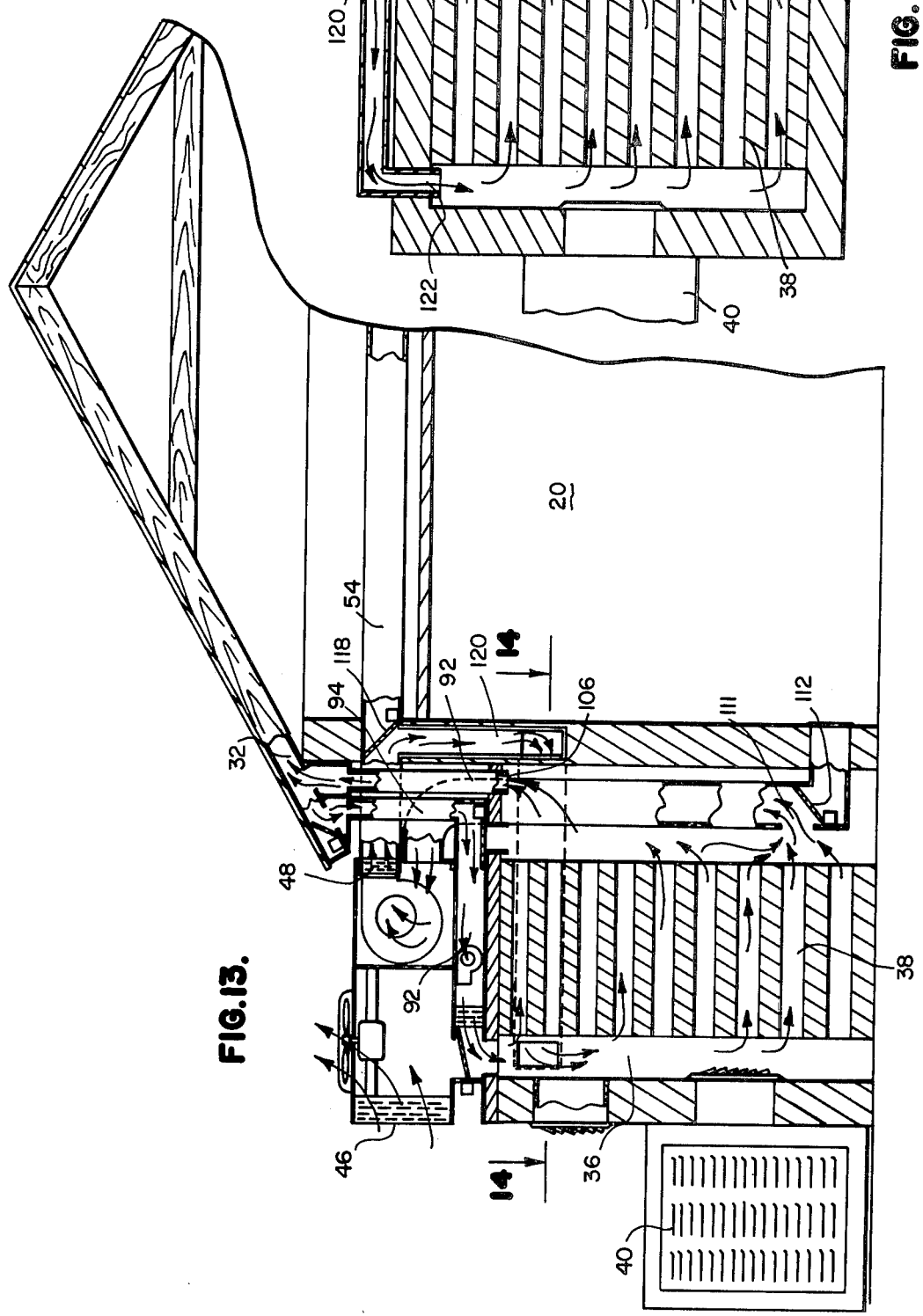

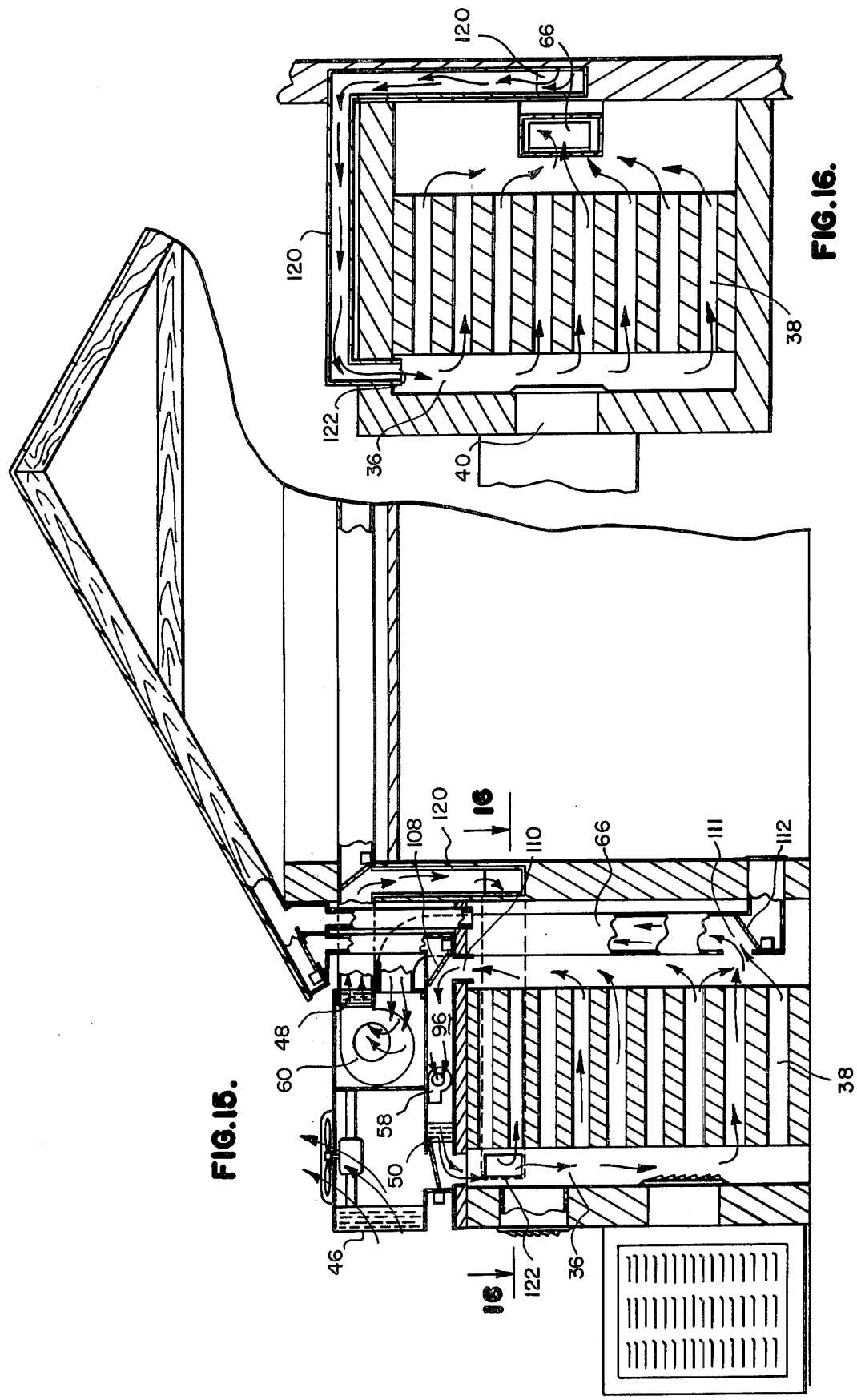

4,066,118

AIR CONDITIONING SYSTEM

BACKGROUND OF THE INVENTION

A great variety of air conditioning systems have been used and these include conventional heat pumps, conventional refrigeration systems, conventional evaporative coolers, and various means for solar collection of heat or radiation thereof. However, all of these prior art systems have limitations which either cause high costs of operation or relatively limited performance under various ambient conditions, as for example evaporative coolers are relatively low in cooling capacity under ambient conditions wherein high humidity and high temperatures pervail. Conventional refrigeration systems tend to operate relatively well under the foregoing high temperature high humidity conditions. However, conventional refrigeration systems tend to cause undue extraction of humidity when the ambient humidity is relatively low. In many such instances these systems require the employment of a humidifier in addition to the conventional refrigeration system. Conventional heat pumps are adapted either to be operated as refrigeration systems or as a heating system. The heat pump system sometimes operates under marginal functional conditions when the outside air temperature is low. Under these situation, the heat pump sometimes fails to provide sufficient heating for the interior of a building room. The conventional heat pump, however, does have one particular advantage. That is that it tends to balance the power requirements of domestic heating and cooling throughout the year from summer to winter. Such heat pump systems tend to equalize the electrical power requirements from summer to winter. Therefore, they provide for optimum use of power generation facilities serving municipal areas.

Conventional solar heating and radiation systems rely upon ambient conditions. When ambient conditions are adverse for a substantial period of time, such systems fail to perform adequately to provide the necessary heating or cooling for a building room. Solar systems may include thermal storage facilities. However, such systems have heretofore required unreasonably bulky storage systems due to the marginal capacity of solar heating and cooling which depend upon relatively constant ambient conditions.

SUMMARY OF THE INVENTION

The present invention relates to a special heat pump having an outside or ambient heat exchanger; an inside heat exchanger communicating with the interior of a building room or the like; and a third heat exchanger in series with the outside or ambient heat exchanger for use in transferring heat or cooling to the refrigerant material, such as freeon or the like, within the heat pump system; the third heat exchanger being directly in series with the outside heat exchanger of the heat pump and communicating with a source of heating or cooling provided by a thermal storage means into which heat or cooling may be delivered from the inside heat exchanger of the heat pump during times when operation thereof is most efficient and when conditioning of the interior of a building room is not placing critical demands upon the heat pump. Additionally, the invention employs solar heat collecting and radiating means which communicates with the thermal storage means of the invention and an air moving means is adapted to circulate air through the solar radiation means and through the thermal storage means of the invention. Another air moving means is adapted for use in circulating air through the inside heat exchanger of the heat pump and into and out of the thermal storage means of the invention. The solar heat collecting and radiation means of the invention is preferably disposed in the roof of a building; while the thermal storage means may be disposed either in a space adjacent the building room being air conditioned or may be disposed beneath the building if desired.

Evaporative cooling communicates with the thermal storage means of the invention. The evaporative cooling means comprises an air moving means adapted to provide for the deliverance of evaporatively-cooled air into the thermal storage means and also through suitable dampers and ducts to the interior of a building room depending upon requirements in response to various ambient conditions. Additionally, means is provided for moving evaporatively cooled air into contact with the aforementioned third heat exchanger which is directly in series with the outside ambient heat exchanger of the heat pump, so as to augment operation thereof during period when outside ambient temperatures are very high and tend to tax the capacity of the heat pump when it is operated as a refrigeration system.

Additionally, the invention comprises means for conducting hot air from the thermal storage means of the invention to such third heat exchanger which is directly in series with the outside heat exchanger of the heat pump, so as to augment the operation of the heat pump during times when the outside ambient atmosphere is very low and the heat pump is used to gather heat from the outside air and transfer it to the inside heat exchanger and into the building room. The operation of the air conditioning system of the invention is such that the heat pump may operate efficiently on a cold night when ambient conditions are below 40° such that the aforementioned augmentation operation of the heat pump may be attained by drawing heat from the thermal storage means and transferring it to the third heat exchanger in series with the outside heat exchanger of the heat pump and during the day, when solar radiation is high and when ambient conditions are compatible therewith, solar radiation may be transferred to the storage means of the invention. At the same time, during periods when there is no demand for heating of the interior of the building room, the heating capacity of the heat pump may be devoted to storage of heat energy into the thermal storage means of the invention. At this particular time, and under such ambient conditions, the heat pump operates very efficiently since the ambient air temperature is sufficiently high to contain a substantial BTU content and heat accumlated with the heat pump under such conditions is very economically gathered from the atmosphere and stored for use at night when the air temperature is very low and the BTU content of the air is scarce and during a time when the heat pump is operating at a relatively inefficient condition. Thus, heat economically stored in the thermal storage means by the heat pump during the day can be used to augment operation of the heat pump at night by transferring heat from the thermal storage means to the aforementioned third heat exchanger which is in series with the outside heat exchanger, and to thus cause the heat pump to operate in a relatively efficient manner for providing heat to the interior of a building room at night.

Additionally, during the winter time when low temperature ambient conditions exist, the collection of heat by the heat pump during the daytime is augmented by the solar heat collecter of the invention which also contributes heat to the thermal storage means of the invention. This is accomplished by suitable ducts and dampers for transferring the heat by convection from heat exchanger means in the roof structure of a building in which the aforementioned room to be air conditioned is located. Thus, during the winter time, heating of a building room may be accomplished by the air conditioning system of the invention utilizing both solar heat and heat collected by the heat pump for convection to the thermal storage means of the invention so that during low ambient temperature conditions, heat may be drawn from the thermal storage means to augment operation of the heat pump.

During the summer time when ambient temperature conditions are high, the heat pump operates as a refrigeration system to cool the interior of a building room during the day. At times when the humidity is also high, operation of the heat pump may be augmented by cool air drawn from the thermal storage means and applied to a third heat exchanger in series with the outside heat exchanger, which is operating with ambient air. Thus, during the day, the heat pump operation may be augmented by cooling from the thermal storage means of the invention. Additionally, an evaporative cooler coupled to the system is adapted for use in forcing evaporatively cooled air over the third heat exchanger in series with the outside heat exchanger providing additional augmentation of operation of the heat pump to provide refrigeration cooling for the interior of a building room. Furthermore, the system of the invention provides for evaporative cooling of the interior of the room during high ambient temperature conditions when the humidity is relatively low.

During the summer and during night time operation when the building room requires no cooling or during interum periods when the thermostat shuts off refrigeration provided by the heat pump, such refrigeration at those times may be devoted to cooling the thermal storage means of the invention so that augmentation of the heat pump operation may be attained during the day when the ambient temperatures are relatively higher. Additionally, at night the solar heat exchanger of the invention serves as a solar radiater and radiates heat to the far sky which on a clear night may be on the order of minus 50° Farenheit and in this manner the thermal storage of the invention may also be cooled at night in addition to operation of the evaporative cooler as well as the use of the inside heat exchanger which operates as a refrigeration system. Thus, the thermal storage means of the invention may be cooled by all three media at appropriate times when the demands of the building room thermostat permit.

The heat pump operation may be augmented to provide refrigeration of the interior of a building room by an evaporative cooler of the invention which also cools the thermal storage means and a third heat exchanger which is in series with the outside heat exchanger of the heat pump. Thus, the evaporative cooling augmentation of the third heat exchanger of the heat pump may take place during a time when refrigeration capacity of the heat pump is marginal relative to high ambient temperature and humidity conditions.

The invention comprises a combination of a heat pump, thermal storage means, evaporative cooling, solar heat collection and radiation, as well as the aforementioned novel heat pump system employing three heat exchangers, one of which is adapted to augment operation of the outside heat exchanger and the invention also comprises air moving means for convection of heat relative to the aforementioned third heat exchanger of the invention as well as to the outside and inside heat exchangers of the heat pump and also relative to the evaporative cooling means and the thermal storage means as well as the solar heat collecting and radiation means, all of which cooperates to deliver air at the proper temperature into the interior of a building room upon demand of the indoor thermostat. The system of the invention comprises various air moving means and duct means with suitable dampers for directing air for conveying heat or cooling into the building room as well as into or out of the thermal storage means in relationship to the novel heat pump of the invention and relative to operation of the evaporative cooling means as well as the solar collection and radiation means of the invention.

The overall cooperative functions of the air conditioning system of the invention provide for the conservation of electrical energy as well as improved economy for the air conditioning of various building rooms. Additionally, the invention provides for refrigeration as well as evaporative cooling and the control of humidity as well as efficient heating and cooling performance throughout all seasons of the year.

Accordingly, it is an object of the invention to provide a novel heat pump having three heat exchangers, one of which is adapted for use in receiving heating or cooling to augment operation of the heat pump during various ambient temperature and humidity conditions in relation to a heat storage means which provides for the thermal augmentation of the operation of said heat pump.

Another object of the invention is to provide an air conditioning system which integrates operation of solar heating and radiation as well as refrigeration cooling and heat pump heating, together with evaporative cooling, all related to a thermal storage means adapted to conserve thermal energy and to provide a means for storing it as it is acquired under most efficient and economical operating conditions of the heat pump, as well as operation of the solar heat collector and solar radiator system of the invention and relative to combined functions of the heat pump and evaporative cooler means as well as the solar heat collecting and radiation means of the invention.

Another object of the invention is to provide a novel heat pump air conditioning system operating in conjunction with a thermal storage means wherein heat or cooling may be stored relative to day and night operations both summer and winter which provides for augmentation of the operation of the heat pump to insure its most efficient functional conditions during such times, and to thereby conserve energy as well as to afford economy in the air conditioning of the building room.

Another object of the invention is to provide a novel heat pump and thermal storage means wherein the heat pump is provided with three heat exchangers, one subject to the outside ambient atmosphere, another subject to the flow of air to deliver heating or cooling to the interior of a building room, and a third heat exchanger in series with the outside heat exchanger and to thereby provide means which is subject to the flow of air from the thermal storage means of the invention to augment operation of the heat pump during critical ambient temperature conditions which may exist relative to the outside heat exchanger.

Another object of the invention is to provide for cooperation of an evaporative cooler with the aforementioned heat pump and particularly to cool the aforementioned third heat exchanger during times when the ambient temperature conditions are high and tax the thermal capacity of the heat pump for cooling the interior of a building room.

Further objects and advantages of the invention may be apparent from the following specification, appended claims and accompanying drawings.

BRIEF DESCRIPTION OF THE DRAWINGS

FIG. 5 is a reduced sectional view of the air conditioning system of the invention as compared to that shown in FIG. 1 and discloses the system in connection with a building room. FIG. 5 illustrates the system operating under conditions where the outdoor temperature is above 40° Farenheit and a building room is being heated and wherein the thermal storage means has a reserve of heat energy;

FIG. 6 is a view of the air conditioning system of the invention similar to that shown in FIG. 5 operating under conditions wherein the outdoor temperature is above 40° Farenheit and during the day when the building room requires no heat and showing the system collecting thermal energy from the solar energy collector and transferring it into the thermal storage means of the invention;

FIG. 7 is a view similar to FIGS. 5 and 6, showing the air conditioning system of the invention operating at night under outdoor temperatures ranging below 40° Farenheit and wherein the system is operating with the heat pump to heat the interior of the room and wherein energy is being transferred from the thermal storage means to the third heat exchanger of the heat pump for augmenting operation thereof;

FIG. 8 is another view similar to FIGS. 5 and 6 and showing the system during periods when evaporative cooling is used to cool the building room disclosed in FIG. 8;

FIG. 9 is a view similar to FIGS. 5 to 8 inclusive showing the air conditioning system of the invention employing the heat pump for cooling the interior of a building room with refrigeration;

FIG. 10 is a view similar to FIGS. 5 to 9 and showing the air conditioning system of the invention operating by means of the heat pump to cool the interior of a room when ambient conditions are critical to the capacity of the heat pump and showing the evaporative cooler of the invention assisting the heat pump by passing cool air over the third heat exchanger thereof which is in series with the outside ambient heat exchanger and thus improving the capacity of the heat pump relative to the high outside ambient temperature conditions;

FIG. 11 is a fragmentary view similar to FIGS. 5 to 10 inclusive showing the heat pump of the air conditioning system operating at night and in the summer time for the purpose of cooling the thermal storage means of the invention when cooling of the building room is not required;

FIG. 12 is a fragmentary sectional view taken from the line 12—12 of FIG. 11;

FIG. 13 is a view similar to FIGS. 5 to 10 inclusive showing the building room fragmentarily and showing the air conditioning system of the invention operating during the day in winter time and utilizing the solar heat collector to collect heat and showing the heat pump also collecting heat from the outside atmosphere whereby the heat pump and the solar collector are both devoting heat energy to the thermal storage means for subsequent use at night;

FIG. 14 is a fragmentary sectional view taken from the line 14—14 of FIG. 13;

FIG. 15 is a view similar to FIGS. 11 and 13 showing the system operating in a manner whereby the thermal storage means of the invention may be either heated or cooled as desired according to ambient temperature conditions and utilizing the third heat exchanger of the heat pump for augmenting operating of the heat pump and in relation to the outside ambient heat exchanger;

FIG. 16 is a fragmentary sectional view taken from the line 16—16 of FIG. 15;

FIG. 18 is an enlarged sectional view of a damper actuating mechanism taken on the same plane as FIG. 4.

DESCRIPTION OF THE PREFERRED EMBODIMENTS

Figure 1:
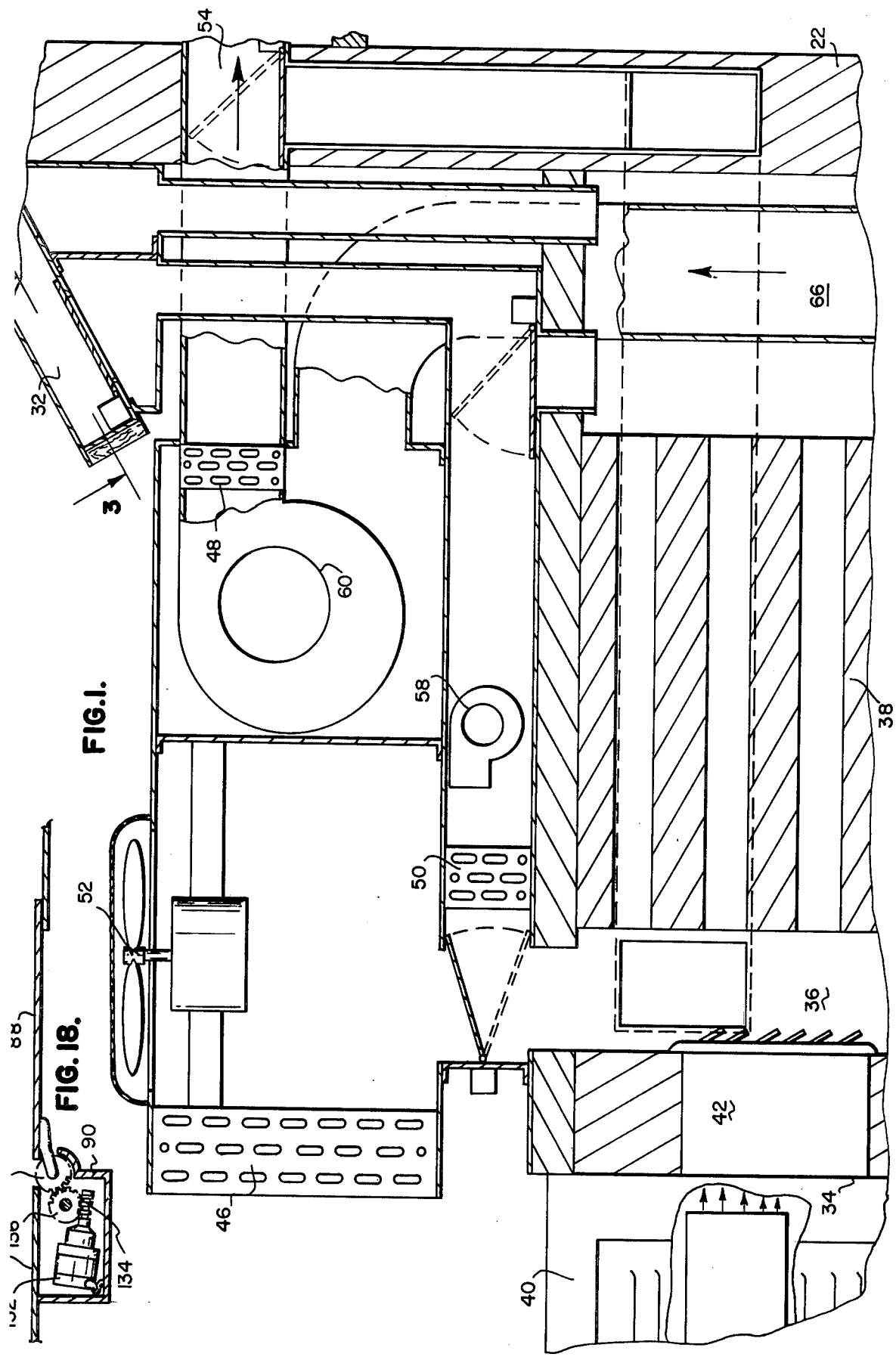
FIG. 1 is a fragmentary sectional view of the air conditioning system of the invention showing various component parts of the heat pump, the thermal storage means, the evaporative cooler means and the solar heat collecting and radiating means of the invention together with various air moving means, ducts and dampers.

As shown in FIG. 5 of the drawings, the air conditioning system is adapted to cool the interior 20 of a building room defined by walls 22 and 24, a floor 26 and a ceiling 28. The building of which the room 20 is a part has a roof 30 in which a solar collector and radiator means 32 is disposed. At the outer side of the wall 22 is an enclosure generally defined by a compartment wall 34 enclosing a space 36 in which a thermal storage means 38 is disposed. An evaporative cooler 40 is provided with a delivery duct 42 communicating with the space 36 and with the thermal storage means 38. A heat pump of the air conditioning system of the invention is generally designated 44 and comprises an outside heat exchanger 46 coupled to an inside heat exchanger 48 and a third heat exchanger 50 is disposed in series with the heat exchanger 46, all as will be hereinafter described in connection with FIG. 2 of the drawings which is a diagramatic illustration of the components of the heat exchanger.

Figure 2:
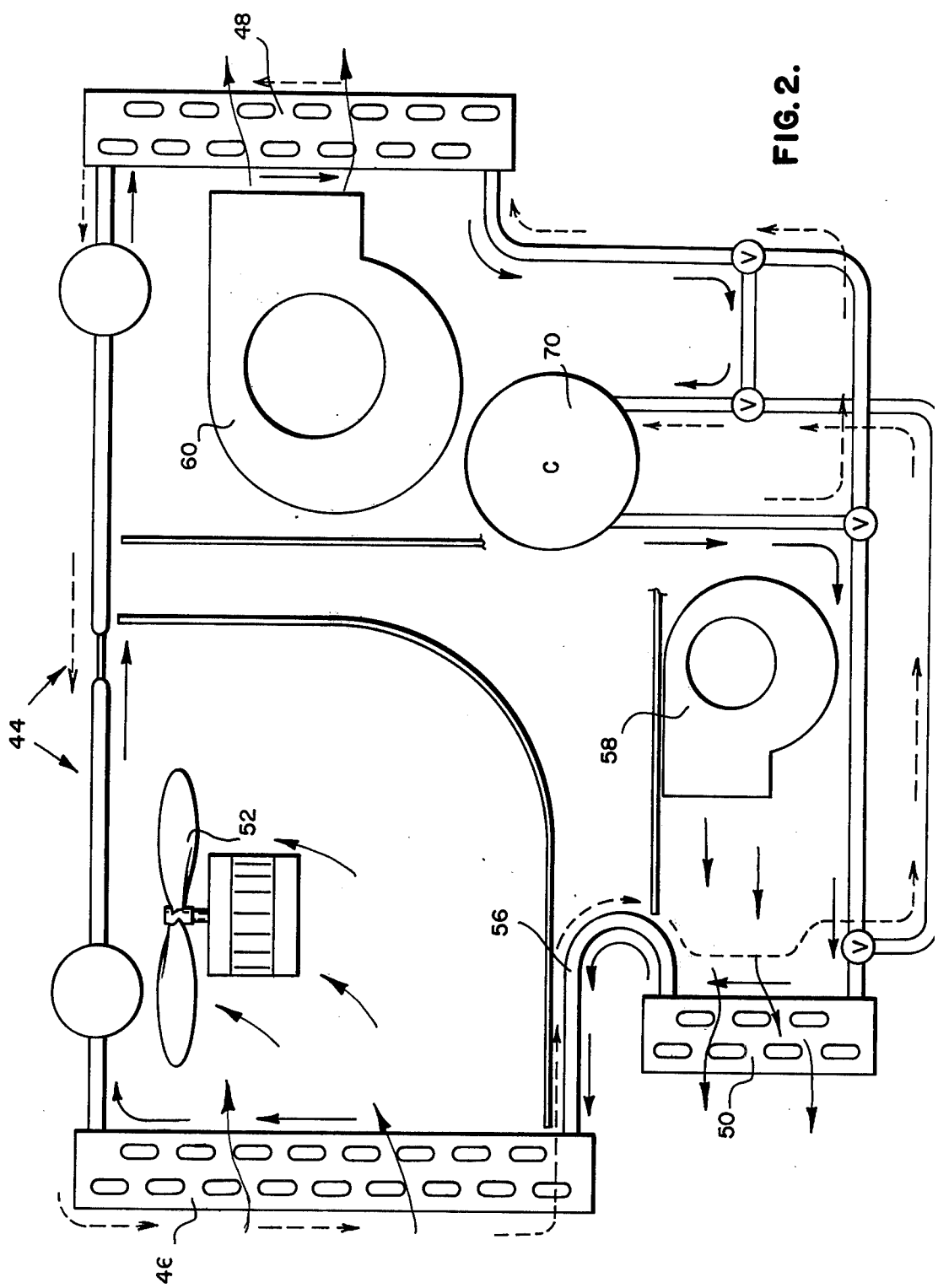
FIG. 2 is a diagramatic illustration of the heat pump means of the invention, showing a special heat pump having three heat exchangers involving a heat exchanger communicating with the interior of a building room, another heat exchanger communicating with ambient outside atmosphere and a third heat exchanger which is in series with the heat exchanger which communicates with the outside atmosphere.

As shown in FIG. 2 of the drawings, the outside heat exchanger 46 of the heat pump 44 is subject to the flow of atmospheric air therethrough under force of a fan 52 which drives the air through the heat exchanger 46 and back out into the ambient atmosphere.

The inside heat exchanger 48 of the heat pump 44 is disposed to communicate through a duct 54 with the interior 20 of the building room, as will be hereinafter described. The third heat exchanger 50 of the heat pump 44 is connected in series with the heat exchanger 46 by means of a connecting tube 56. It will be understood that the third heat exchanger 50 may be coupled to the outside heat exchanger 46, or they may be contiguous with air flow partitions designed to provide for separate air flow conditions relative to the heat exchangers 46 and 50. Thus, the heat exchanger 50 may be only a portion of the heat exchanger 46 and subject to air flow as guided by partition and duct structure.

A blower or air moving means 58 is disposed to force air through the heat exchanger 50 and the blower or air moving means 60 is disposed to force air through the inside heat exchanger 48 toward the interior 20 of the building room, as shown in FIG. 5 of the drawings.

Also shown in FIG. 5, is the duct 54 which receives air from the blower 60 via the heat exchanger 48 and the duct 54 delivers air through a conventional air delivery register 62 to the interior 20 of the building room and a return air register 64 in the lower portion of the wall 22 of the room 20 allows air to return via a duct 66 to the inlet 68 of the blower 60.

As shown in FIG. 5 of the drawings, the air conditioning system is operating to heat the interior 20 of the building room under conditions wherein the temperature of the outside or ambient atmosphere is above 40° Farenheit. Accordingly, the outdoor or outside heat exchanger 46 is collecting heat from the atmosphere and is transferring it through the heat exchanger 50 and compressor 70 to the inside heat exchanger 48 as shown in FIG. 2, wherein the broken lines with arrowheads indicate heat pump operation tending to transfer by means of freeon or other gas heat collected by the outside heat exchanger 46 through the heat exchanger 50 and the compressor 70 to the inside heat exchanger 48. Thus, the broken arrow lines, as shown in FIG. 2, indicate the heat pump operation for heating the interior of the building room 20 with the air moving means 60 of the heat pump forcing air through the heat exchanger 48 while the air moving means 52 forces air through the heat exchanger 46. The air passing through the heat exchanger 46 passes from atmosphere back to atmosphere while the air passing through the heat exchanger 48 carries heat to the interior 20 of the building room. The air continues to recirculate while the heat pump functions as hereinbefore described to act as a heater for the interior 20 of the building room. This operation, as shown in FIG. 5, is typical when the outdoor temperature is above 40° and the heat pump does not require any augmentation from the thermal storage means of the invention. Accordingly, as shown in FIG. 5, the blower 60 projects air through the heat exchanger 48 and the air is heated and delivered through the duct 54 to the outlet grill 62 and the return air, near the floor, is received through the register or grill 64 and passed through the duct 66 and back to the inlet of the blower 60.

As shown in FIG. 6 of the drawings, the air conditioning system of the invention is shown conducting heat from a solar collector to the thermal storage means of the invention under conditions in which the outdoor temperature is above 40° Farenheit and during the day, while the interior 20 of the building room does not require any heat. Thus, the solar collector in the roof 30 may be used to collect heat for heating the thermal storage means so that the heat may subsequently be used at night when temperatures are considerably lower for the purpose of augmenting operation of the heat pump. The solar collector and radiator means of the invention comprises a collector or heat exchanger in the roof 30; this being the solar collector 32, hereinbefore described. The solar collector comprises a roof construction in which roof rafters 72 are spaced apart and between these rafters a partition 74 extends at its one end 76 from a position adjacent the eaves 78 to a position 80 at which an end of the partition 74 is spaced from the gable portion 82 of the roof 30, so that air may pass through an inlet 84 at one side of the partition 74 and pass upward and around the end 80 of the partition and downward as indicated by arrows and pass out through an opening 86 controlled by a damper 88. The damper 88 is provided with a substantially conventional motor driven actuator 90 similar to that which will be hereinafter described in connection with FIG. 18 of the drawings. It will be seen in FIG. 6 that an upwardly directed duct 92 communicates with the opening 84 and that a downwardly extending duct 94 communicates with the opening 86 controlled by the damper 88.

The solar energy collector 32 is provided with a cover 92 which is disposed above the rafters 72 and above the upper edge of the partition 74 so as to form an upwardly directed passage between the rafters 72 and the partition 80 and between the partition 80 and the rafters 72 on the opposite side thereof.

Figures 3, 4:
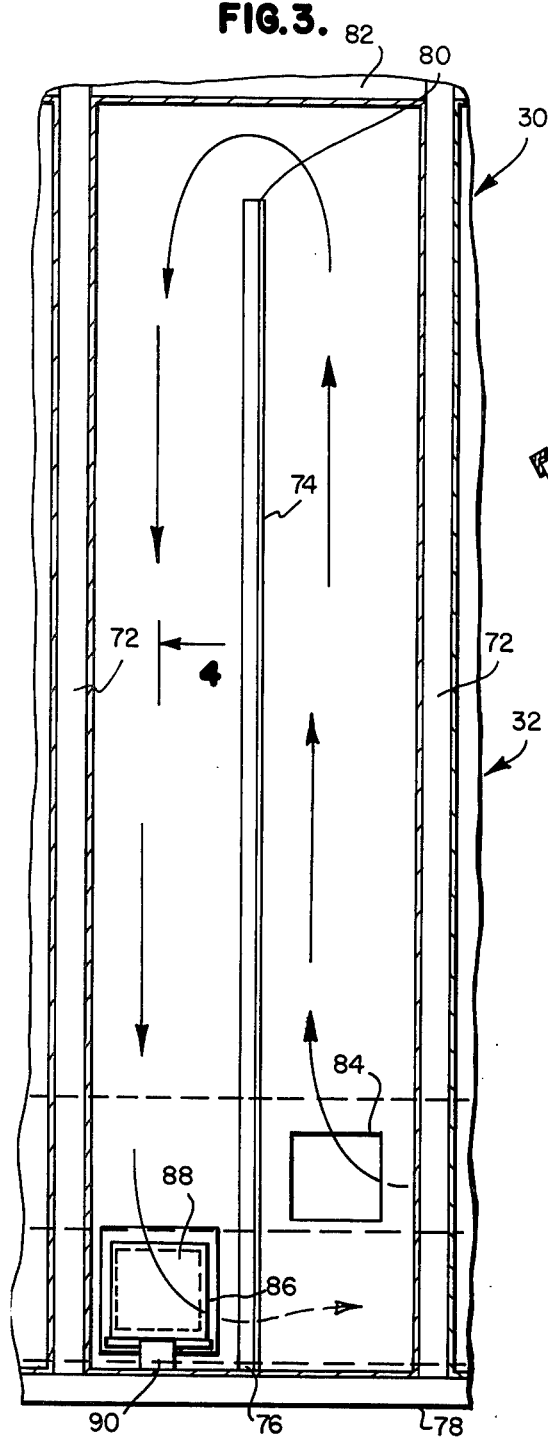
FIG. 3 is a fragmentary sectional view taken from the line 3—3 of FIG. 1 showing details of the solar heat collecting and radiator means of the invention.
FIG. 4 is a fragmentary sectional view taken from the line 4—4 of FIG. 3.

Communicating with the downwardly directed duct 94 shown in FIG. 4 of the drawings, is a horizontal duct 96 which communicates with the inlet of the blower 58 or air moving means as it may be termed. This duct 96, as shown in FIG. 6 of the drawings, is provided with an outlet portion 98 controlled by a damper 100 which permits air, as shown in FIG. 6, to pass from the outlet 86 of the solar energy collector 32 downward to the inlet side of the thermal storage means 38. Thus, the air delivered at the end 98 of the duct 96 passes into the space 36 hereinbefore described and passes through the thermal storage means 38. This means 38 may be constructed of stacks of concrete blocks or the like which provide substantially horizontal passages 102 through which air may flow so as to exchange heat from the air to the blocks of the thermal storage means and the air may progress through the thermal storage means into a space 104 at an opposite side thereof which communicates with an open end 106 of the duct 92 hereinbefore described, all as shown best in FIG. 6 of the drawings.

The air moving means 58 or blower moves the air through the thermal storage means 38 and upwardly through the duct 92 and the opening 84 and around the partition 74 and downwardly through the outlet opening 86 and into the duct 94 and then to the duct 96 and back to the blower 58.

In this manner, heat may be transferred by convection from the area of the roof 30 and the interior of the solar collector 32 to the thermal storage means 38.

As shown in FIG. 7, the air conditioning system of the invention is shown operating at night with an outdoor temperature below 40° Farenheit wherein the residence requires heat and the storage has been previously heated as described in relation to FIG. 6 of the drawings, Additionally, it will be understood that the storage means may also have been heated previously during the day by means of the heat pump as hereinbefore described. Under the operating conditions as shown in FIG. 7 of the drawings, a damper 108 communcating with a space 104 at the outlet of the thermal storage means is opened such that the damper 108 uncovers an opening 110 allowing heated air to flow into the duct 96 in accordance with operation of the blower 58 so as to force air to circulate through the third heat exchanger 50 and to thereby add heat to the freeon passing through the outside heat exchanger 46 and to thereby augment the heat collecting capacity of the heat pump when collecting heat from the relatively cold atmosphere and transferring the heat to the heat exchanger 48 which exchanges the heat to air delivered to the interior 20 of the room via the duct 54 and register 62; this being accomplished by operating the blower 60 to move the air in a circulatory manner through the interior 20 of the room and backwardly through a register 64 and the duct 66 to the inlet of the blower 60. Accordingly, the thermal storage means 38 gives up heat to the air passing through the opening 110 and into the duct 96 so that the heat may be added to the outside heat exchanger via the third heat exchanger 50, as hereinbefore described.

As shown in FIG. 8 of the drawings, the air conditioning system of the invention is operating under ambient temperature conditions which vary and primarily as would be the case during the summer when the relative humidity is nominal. As shown in FIG. 8, the evaporative cooler 40 delivers air through its outlet grill 42 and into the space 36 whereupon the evaporatively cooled air flows through passages 102 in the thermal storage means 38 and a damper 112 in the duct 66 is open to allow the evaporatively cooled air to enter the side of the duct 66 and to pass to the inlet of the blower 60 which forces the evaporatively cooled air outward through the duct 54 and register 62 into the interior 20 of the room and a window 114 may be open to allow the evaporatively cooled air to escape to the outside atmosphere, as indicated by arrows in FIG. 8 of the drawings. Thus, the air conditioning system of the invention provides evaporative cooling to the room 20 during the summer time and especially during periods when the relatively humidity is low and during such periods as the evaporative cooling may have a relatively efficient mode of operation due to the latent heat of vaporization.

As shown in FIG. 9 of the drawings, the air conditioning system of the invention is shown with the heat pump operating on a warm day or warm night for refrigeration cooling of the interior 20 of the building room. During this mode of operation the outside heat exchanger 46 operates as a condenser while the inside heat exchanger 48 operates as an evaporator and the air is moved convectively by the blower 60 through the duct 54 after it has passed through the heat exchanger 48. Thus, cool air is delivered through the register 62 and into the interior of the room 20, after which the air passes outward near the floor through the register 64 and the duct 66 back to the inlet of the blower 60. This mode of operation may be expected when the ambient temperature is below 90°, for example, and during such conditions in which the heat pump does not require any augmentation from the thermal storage means or from the evaporative cooler 40.

As shown in FIG. 10 of the drawings, the air conditioning system of the invention is being operated under high ambient temperature conditions which are critical to the operation of the heat pump and wherein the evaporative cooler is used to assist the heat pump.

Referring to FIG. 10, it will be seen that the heat exchanger 46 is operated in the conventional manner by passing air thereover with operation of the fan 52 and that the evaporative cooler 40 delivers air through the thermal storage means 38 in a manner as hereinbefore described. The air passing upwardly through the opening 110 while the damper 108 is held open and the air passing through the opening 110 is forced through the duct 96 by the blower 58 which forces the evaporatively cooled air over the third heat exchanger designated 50. This assist in cooling the refrigerant which passes through the outside heat exchanger 46 while it acts as a condenser and therefore increases the capacity of the heat pump due to the fact that the air passing over the heat exchange portion 50 is evaporatively cooled by the evaporative cooler 40. Accordingly, when high ambient temperatures tax the capacity of the heat pump, the evaporative cooler 40 is utilized to cool the heat exchanger 50 which is in series with the heat exchanger 46.

Communicating with the duct 96 is a damper 115 which alternately may deliver air from the heat exchanger 50 to the space 36 at the inlet of the thermal storage means 38 or the damper 115 may be in the position shown in FIG. 10 where the evaporatively cooled air passes through the heat exchanger 50 and passes in the direction of arrows upwardly through the fan 52 and back to atmosphere.

Due to the fact that the evaporative cooler is a large flow capacity device, an excess air outlet grill 116 is placed in the wall 34 in communication with the space 36 so as to exhaust some of the excess evaporatively cooled air to atmosphere. During this mode of operation, the evaporative cooler also cools the thermal storage means 38.

As shown in FIG. 11, the air conditioning system of the invention is shown operating in the summer time at night for the purpose of cooling the thermal storage means in anticipation of higher daytime temperatures for the following day. The heat pump is thus used to cool the thermal storage means at night during periods when the interior of the room 20 does not require cooling and during such times as the thermostat does not demand the flow of cool air thereto.

In FIG. 11, the heat pump operates as a refrigeration cooling system and a damper 118 in the duct 54 serves to divert air into a branch duct 120 which, as shown in FIG. 12 of the drawings, extends around the wall 34 and the duct 120 is provided with an outlet 122 communicating with the space 36 at the inlet side of the thermal storage means 38 such that cool air delivered from the heat exchanger 48 is conducted by means of the damper 118 into the duct 120 and around and into the inlet side of the thermal storage means 38, thereby cooling the thermal storage means 38 as the cold air passes therethrough. The cold air then proceeds back through the opening 111 in the duct 66 which is allowed by an alternate position of the damper 112, as hereinbefore described in connection with FIG. 8 of the drawings. The air after having cooled the thermal storage means 38 passes backwardly through the duct 66 and into the inlet of the blower 60 so as to again circulate back through the thermal storage means as hereinbefore described, so that continuous cooling of the thermal storage means may be accomplished by the heat pump when the room 20 does not require cooling and particularly at night time when ambient temperatures are relatively low and when the cooling of the thermal storage means may be most economical. During this mode of operation, it will be noted that the damper 115 is closed off to the duct 96 so that the refrigerated air does not escape into the duct 96, and is therefore totally routed through the thermal storage means 38.

As shown in FIG. 13, the air conditioning system of the invention is shown operating during a winter day and shows the heat pump as well as the solar collector transferring heat to the thermal storage means while the interior 20 of the building room does not require any heat. This occurs during interums when the thermostat requirements are such that flow into the interior 20 of the room is not needed.

The heat pump, as shown in FIG. 13, is operating with the outside heat exchanger 46 collecting heat from the atmosphere and transferring it to the heat exchanger 48 via the compressor 70 as shown in FIG. 2 of the drawings. The heated air passing into the duct 54 is diverted by the damper 118 so as to force the air to pass into the duct 120 and around through the outlet 122 of the duct 120 and through the thermal storage means 38 and into the duct 66 via the opening 111 adjacent the damper 112.

Some of the air passing through the thermal storage means 38 passes upwardly into the open end 106 of the duct 92 and passes upwardly through the thermal collector 32 as hereinbefore described in connection with FIGS. 3 and 4 of the drawings. The air, after having collected heat in the thermal collector 32, passes downwardly through the duct 94 and the duct 96 back to the inlet space 36 at the inlet of the thermal storage means 38. Thus, the heat pump and the thermal collector of the invention cooperate at the same time to store heat in the thermal storage means 38 during a winter day when the sun is shining and during times when there is no demand for heat at the interior 20 of the building room.

As shown in FIG. 15, the air conditioning system of the invention operates in accordance with the flow indicated by the arrows such that heating or cooling of the thermal storage means 38 may be accomplished by the heat pump using its third heat exchanger which is in series with the outside heat exchanger which operates in conductive relation with outside ambient atmosphere. As shown in FIGS. 15 and 16, air passes from the outlet 122 of the duct 120 into the inlet space 36 at the inlet of the thermal storage means 38 and the air passes through the thermal storage means 38 and backwardly through the opening 10 adjacent the damper 108 and the air thus passing into the duct 96 and through the blower 58 and back around to the inlet space 36. At the same air passes from the outlet of the thermal storage means 38 and into the opening 111 with the damper 112 open such that some of the air recirculates through the duct 66 and back to the inlet of the blower 60 which is forcing air through the inside heat exchanger 48. Thus, the thermal storage means may be either heated or cooled using a combination of all three heat exchangers 46, 48, and 50, together with the blowers 58 and 60 and the respective ducts and dampers, as hereinbefore described.

Figure 17:
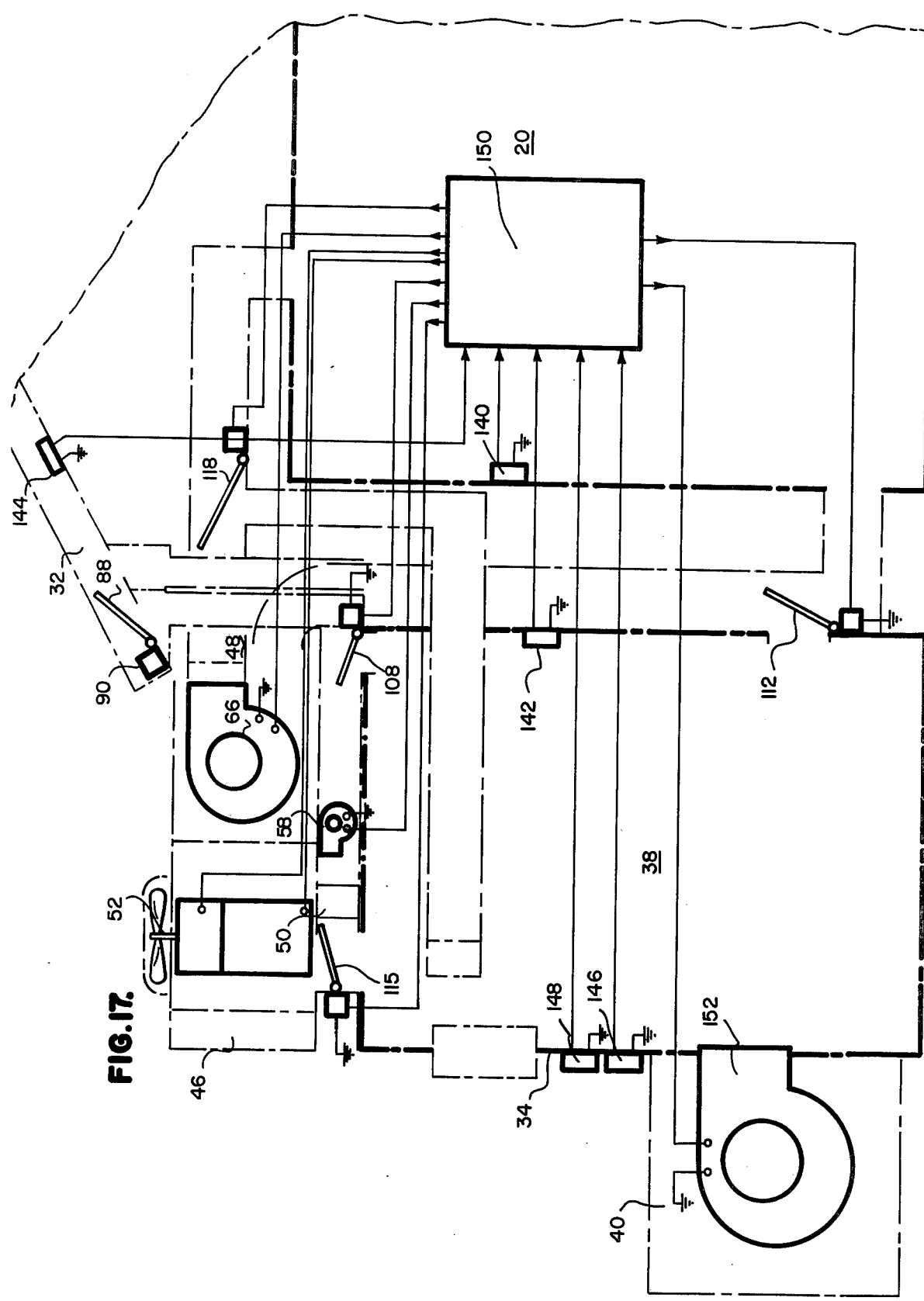
FIG. 17 is a diagramatic view of the various components of the air conditioning system including the disposition of thermostatsi, dampers, air moving means and various components of the solar collector and radiator, as well as the heat pump features and thermal storage area.

As shown in FIG. 17, all of the dampers 88, 108, 112, 115, and 118 are similar and are provided with an actuator mechanism 90 as shown in FIG. 18 of the drawings. This mechanism 90 includes a housing 130 wherein an electric motor 132 operates a worm gear 134 meshing with a worm wheel 136 which in turn meshes with a second worm wheel 138 to which the damper 88 is connected. Momentary operation of the motor 132 causes the respective gears 134, 136 and 138 to pivot the damper 88 about the axis of the respective gear 138. As shown in FIGS. 17, the control system of the invention comprises several thermostats; namely an indoor thermostat 140 in the interior 20 of the room, a second thermostat 142 is disposed in the space adjacent the space thermal storage means 38, a third thermostat 144 is disposed in the building roof attic adjacent the solar collector 32, and another thermostat 146 is disposed on the outside of the wall 34 and this thermostat 146 senses the outdoor ambient temperature.

Also disposed outside the wall 34 or in the ambient area is a humidity sensing device 148.

A central control unit 150 is provided in combination with the foregoing theremostats to control operation of a blower 152 of the evaporative cooler 40, as well as to control operation of the air moving means 52 and the blowers 58 and 60. Furthermore, the control unit 150 operates the various dampers hereinbefore described in accordance with the various functional dispositions thereof and in combination with each other according to various ambient conditions and in accordance with the desired functional arrangement of the various components hereinbefore described.

It will be obvious to those skilled in the art that various modifications may be resorted to without departing from the spirit of the invention.

I claim:

1. An air conditioning system comprising: a heat pump adapted alternately to reject heat to the ambient atmosphere and to collect heat therefrom as desired; duct means communicating with said heat pump and adapted alternately to deliver either cool air or heated air into a building room; thermal storage means communicating with said heat pump and disposed and adapted either to collect BTU's directly from said heat pump when it is delivering heat, or to be cooled by said heat pump when it is delivering cool air; and duct means for delivering either heat or cooling from said thermal storage means to said system when the respective demand in said room may exceed the thermal capacity of said heat pump; and means controlling said heat pump to either store heat in said thermal storage means or to cool it when the respective demand of said room is less than the thermal capacity of said heat pump; said heat pump having a first heat exchanger communicating with atmosphere outside said room; said heat pump having a second heat exchanger communicating with atmosphere inside said room; said heat pump having a third heat exchanger; said first and third heat exchangers having refrigerant passages which are coupled in series; and means for transferring heat from said thermal storage means to said third heat exchanger together with first air moving means disposed for forcing ambient air into contact with said first heat exchanger and back to atmosphere outside said room; second air moving means disposed for forcing air to flow into contact with said second heat exchanger and into said room; first duct and damper means communicating with said second air moving means and disposed to deliver air alternately from said room and said thermal storage means; third air moving means disposed for forcing air from said thermal storage means and into contact with said third heat exchanger; a roof disposed over said room; a solar energy collector in said roof; said solar energy collector having passages extending upwardly and downwardly in said roof; and duct and damper means adapted to provide the flow of air through said solar energy collector and through said thermal storage means and back to said solar energy collector.

2. The invention as defined in claim 1, wherein: an evaporative cooler is disposed to contribute cooling to said third heat exchanger to supplement the thermal capacity of said heat pump.

3. The invention as defined in claim 1, wherein: an evaporative cooler is disposed to contribute cooling to said third heat exchanger to supplement the thermal capacity of said heat pump.

4. The invention as defined in claim 3, wherein: said thermal storage means is provided with a wall like enclosure; said enclosure having an excess flow vent means adapted to vent excess flow of evaporatively cooled air to the atmosphere during cooling of said third heat exchanger and said thermal storage means.

5. The invention as defined in claim 2, wherein: said evaporative cooler is provided with means adapted to force evaporatively cooled air throughout said thermal storage means to said second air moving means.

6. The invention as defined in claim 5, wherein: duct and damper means is disposed alternately to conduct air from said room to said second air moving means and alternately from said evaporative cooler through said thermal storage means to said second air moving means.

7. The invention as defined in claim 3, wherein: damper means is disposed to direct air from said evaporative cooler to outside atmosphere after passing through said third heat exchanger.

8. The invention as defined in claim 7, wherein: said air delivered by said evaporative cooler means is adapted to supplement operation of said third air moving means for moving evaporatively cooled air over said third heat exchanger.

9. The invention as defined in claim 1, wherein: said third air moving means is disposed relative to said last mentioned ducting and damping means to force air from said solar energy collector through said third heat exchanger for delivering heat to the heat transfer media in said heat pump.

10. The invention as defined in claim 9, wherein: a first control thermostat is disposed in said room; a second control thermostat is disposed to sense the temperature in said thermal storage means; a third thermostat is disposed to sense the temperature in said solar energy collector; and a fourth thermostat is disposed to sense the outside ambient air temperature.

11. The invention as defined in claim 10, wherein: a humidity sensor is disposed to sense the humidity of the air in the outside ambient atmosphere and a control unit coupled to said thermostats, said air moving means and said evaporative cooler as well as said damper means for integrating control thereof.

* * * * *